Sept. 28, 1965 J. J. AMODEI 3,209,171

PULSE GENERATOR EMPLOYING MINORITY CARRIER STORAGE DIODES FOR PULSE SHAPING

Filed Nov. 21, 1962 2 Sheets-Sheet 1

INVENTOR.
JUAN J. AMODEI
BY C. C. Richard Jr.
ATTORNEY

Sept. 28, 1965 J. J. AMODEI 3,209,171
PULSE GENERATOR EMPLOYING MINORITY CARRIER
STORAGE DIODES FOR PULSE SHAPING
Filed Nov. 21, 1962 2 Sheets-Sheet 2

INVENTOR.
JUAN J. AMODEI
BY
A.C. Richard Jr.
ATTORNEY 3,209,171

PULSE GENERATOR EMPLOYING MINORITY CARRIER STORAGE DIODES FOR PULSE SHAPING

Juan J. Amodei, Levittown, Pa., assignor to Radio Corporation of America, a corporation of Delaware Filed Nov. 21, 1962, Ser. No. 239,144
12 Claims. (Cl. 307—88.5)

This invention relates to electrical pulse generators, and more particularly, to high frequency voltage pulse generators for use as timing sources.

Many systems, for example data processing systems, require a source of regularly recurring, accurately timed voltage pulses to clock or time the large number of operations that are performed by the system. In order to handle the large amount of information that is being processed today, the systems are being designed and operated at ever increasing speeds, and it is becoming increasingly difficult to design and build pulse generators to clock their operations that possess adequate power output, accurate timing, and relatively simple control of the wave shape of the pulses.

Briefly, in accordance with the invention, high frequency, accurately timed voltage pulses are generated from readily available high power alternating current (A.C.), electrical generators, by using storage diode semiconductor devices. Storage diodes are devices that exhibit the usual diode high electrical conductivity when biased in the forward direction, but upon being reverse biased, unlike the usual diode, they maintain a high conductivity in the reverse direction for a period of time, called the storage period or recovery time, and then decay in an extremely short time, called the decay period, to a low conductivity state. Alternating current energy from the generator is coupled across a first or output storage diode through a second or control storage diode, and output voltage pulses are derived from the changes in voltage across the output diode. The control diode limits the forward conduction time of the output diode, in response to the A.C. energy, to less than one-half cycle and thus shorten its storage period, over the storage period obtained if the output diode were allowed to conduct heavily in the forward direction during the entire half-cycle of the A.C. energy. Thus, the circuit is able to operate at frequencies higher than those obtainable under full half-cycle forward conduction of the output diode. Control of the waveshape of the output pulses may be obtained by applying the A.C. energy to the storage diodes through a transmission line in which multiple reflections of the A.C. energy exist.

The invention is more fully explained hereinafter in the detailed description in connection with the various figures of the drawings, in which.

Figure 3:
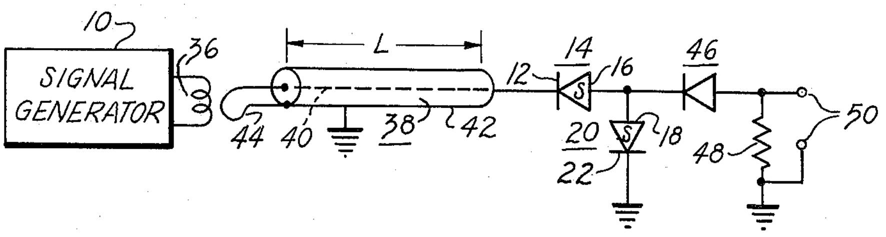
FIGURE 3 is a schematic circuit diagram of a pulse generator circuit illustrating another embodiment of the invention.
Figure 6:
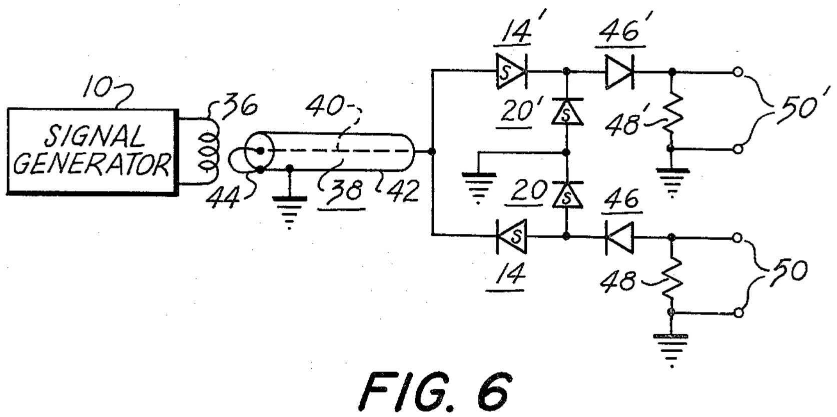
Figure 7A:
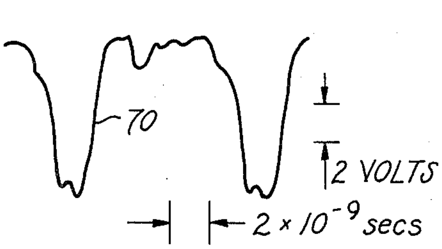
Figure 7B:
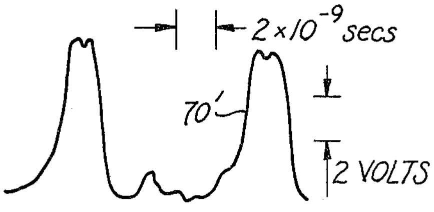

FIGURES *4a, 4b, 4c* and *5a, 5b* are graphs showing curves illustrating certain operational characters of the circuit of FIGURE 3;

FIGURE 6 is a schematic circuit diagram of a pulse generator circuit illustrating another embodiment of the invention; and FIGURES *7a, 7b* are a graph showing curves illustrating certain operational characters of the circuit of FIGURE 6.

Figure 1:
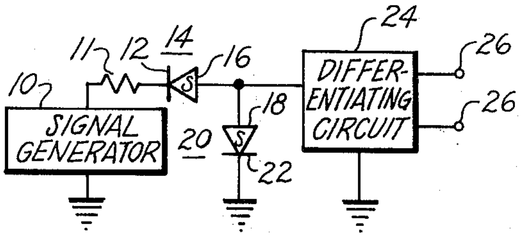
FIGURE 1 is a schematic circuit diagram of a pulse generator illustrating an embodiment of the invention.

The circuit shown in FIGURE 1 includes a conventional signal generator 10 for developing a sine wave voltage, having a pair of output terminals, one terminal being connected to ground, or a point of reference potential, for the circuit and the other terminal being connected to the cathode 12 of a first or control storage diode 14. The generator 10 has an interval impedance illustrated as the resistor 11 connected between the generator 10 and the control diode 14. The interval impedance may be augmented by additional series resistance, if desired. The anode 16 of the control storage diode 14 is connected to the anode 18 of a second or output storage diode 20, and the cathode 22 of the output diode 20 is connected to the point of reference potential for the system. The voltage across the output diode 20 is applied through a differentiating circuit 24 to a pair of pulse output terminals 26.

Storage diodes have been described in the literature (see an article in the Proceedings of the IRE, vol. 50, No. 1, January 1962, pp. 43–52, entitled "P–N Junction Charge Storage Diodes," by Moll et al.). Briefly, however, storage diodes possess the same high conductivity properties as ordinary semiconductor diodes when biased in the forward direction, that is, with the anode of the storage diode is positive with respect to its cathode. Upon being reverse biased, after a period under forward bias, the storage diode is unlike the ordinary semiconductor diode in that it exhibits high conductivity in the reverse direction for a period of time that may be called the storage period or recovery time. At the end of the storage period, the storage diode abruptly falls to a low conductivity state. This transition from high to low conductivity may be called the decay period. The duration of the storage period is responsive to, inter alia, the amount and duration of current flow in the forward direction through the device before it is reverse biased. While the duration of the decay period is somewhat affected by the previous forward current flow, its variation in duration is not significant with respect to this invention and is on the order of $10^{-9}$ seconds (1 nanosecond).

Figure 2:
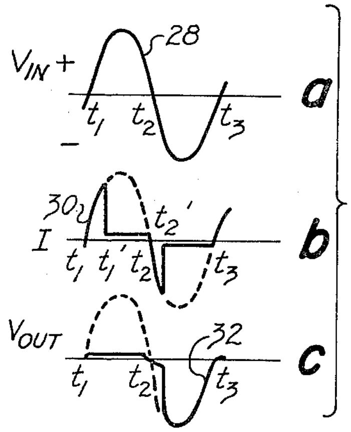
FIGURE 2 is a graph showing curves illustrating certain operational characteristics of the circuit of FIGURE 1.

The voltage from the signal generator 10 is an A.C. voltage wave as shown in curve 28 of FIGURE 2, and is applied through the internal impedance 11 of the generator 10 to the cathode 12 of the control diode 14. A full cycle of the input voltage wave is shown in curve 28 with the voltage during the times $t_1$ and $t_2$ shown as positive-going, and between $t_2$ and $t_3$ as negative-going. Under steady state conditions, at the beginning of a positive half cycle of the input voltage wave 28, a relatively large current flows in the reverse direction through the control diode 14, during its storage period, and in the forward direction through the output diode 20. This is shown on curve 30 in FIGURE 2, which is a plot of the current flow in the circuit against time, between the times $t_1$ and $t'_1$. As the voltage wave 28 continues beyond $t'_1$, the control diode 14 abruptly falls to its low conductivity state during its decay period at the termination of its storage period or recovery time, and only a small reverse current flows in the circuit between the times $t'_1$ and $t_2$. Little output voltage is developed at the output terminals 26 under these conditions, because the output diode 20 is in its high-conductivity, forward-biased state, and is a low impedance across the output terminals 26, preventing the development of significant voltage thereacross. The voltage across the output diode 20 is shown as curve 32 of FIGURE 2. Between the times $t_1$ and $t_2$ the output voltage is insignificantly low.

At the time $t_2$ the input voltage 28 begins to go in the negative direction. The control diode 14 is now forward biased. A relatively large current now flows through the diodes 14, 20 in a direction opposite to the previous current flow during the positive half cycle of the voltage wave 28. The current flow is now in a forward direction through the control diode 14 and in the reverse direction through the output diode 20, during its storage period or recovery time. This action is shown on curve 30 in FIGURE 2 between the times $t_2$ and $t'_2$. At the time $t'_2$ the decay period of the output diode 20 occurs and the conductivity of the diode 20 abruptly becomes small and the current flow falls to a small reverse current. As a result, the voltage across the diode 20 abruptly rises to substantially the level of the instantaneous voltage of the A.C. voltage wave 28, because the output diode 20 now exhibits a high impedance, and practically all of the voltage of the generator 10 is developed across it. This abrupt voltage change, occurring in an interval on the order of one nanosecond, is differentiated by the differentiating circuit 24 to provide an output pulse of voltage at the output terminals 26.

The frequency of the signal generator 10 may be accurately controlled such as by a crystal, and the repetition rate of the output pulses may be made extremely accurate. It will be appreciated that the frequency of the generator 10, and thus the repetition rate of the output pulses, would be limited by the recovery time of the output diode 20 if the control diode 14 were not used, because of the relatively large and fixed storage time of the output diode 20 when subjected to full half cycle conduction in the forward direction. However, in accordance with the invention, the control diode 14 limits the forward conduction of the output diode 20 and shortens its storage period. As noted in the previously cited article in the Proceedings of the IRE, storage diodes may be constructed with different recovery times, and by proper selection of diodes, pulse repetition rates of 300 m.c.s. (megacycles per second) or higher may be achieved.

The output voltage pulses from the circuit of FIGURE 1 are roughly triangular in shape and their shape cannot be readily controlled. Control of the shape of the output pulses may be achieved by the embodiment of the invention shown in FIGURE 3. The circuit of FIGURE 3 includes the signal generator 10, having an output inductor 36. A co-axial transmission line 38, having a length L and an inner conductor 40 and an outer conductor 42, has a pick up coil 44 at one end thereof electrically connected between the inner and outer conductors 40, 42 and inductively coupled to the output inductor 36. The outer conductor 42 of the transmission line 38 is also connected to the point of reference potential for the circuit. At the other end of the transmission line 38, the inner inductor is connected to the cathode 12 of the control storage diode 16, and the output storage diode 20 has its anode 18 connected to the anode 16 of the control storage diode 16 and its cathode 22 connected to the point of reference potential, in the same manner as the circuit of FIGURE 1. Output pulse signals which are developed in a manner hereinafter explained appear across the output diode 20 and are coupled through a clipping diode 46, which is a conventional semiconductor diode, across an output resistor 48. The clipping diode 46 prevents the output signal from overshooting in a polarity opposite to the polarity of the output pulses. A pair of pulse output terminals 50 are connected across the output resistor 48 across which negative-going output pulses appear.

The operation of the control and storage diodes 14, 20 of FIGURE 3 is the same as explained in connection with FIGURE 1, however, the waveform of the voltage applied to the diodes 14, 20 is altered by the transmission line to be other than a pure sine wave. This action eliminates the need for differentiating the voltage across the output diode 20 to derive the output pulses, and, in addition, provides a means to control the shape of the output pulses.

The shape of the output pulses is controlled by multiple reflections of the voltage along the transmission line 38. The generator end of the line 38 is substantially a short circuit, and the output end of the line 38 is loaded by the complex and varying impedance of the control and output storage diodes 14, 20. These terminations of the line 38 insure the generation of multiple reflection along the line 38, and the input voltage wave shape to the diodes 14, 20 may be made highly complex and unsymmetrical. By proper choice of the length L of the line 38, the rise time and shape of the output pulses developed at the pulse output terminals 50 may be accurately determined. Also, because of the non-symmetrical character of the input wave, the amount of reverse and forward current conduction through the output 20 may be controlled by varying the length of the transmission line 38. The wave shaping properties of the circuit are not limited to periodic signals from the signal generator 10, but work equally well with aperiodic signals.

Figure 4A:
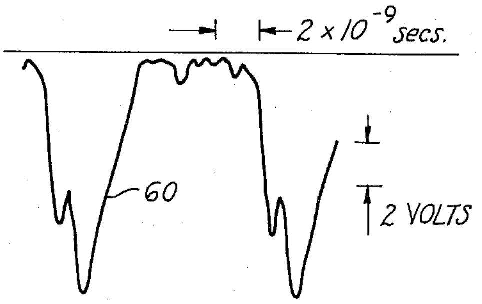
Figure 4C:
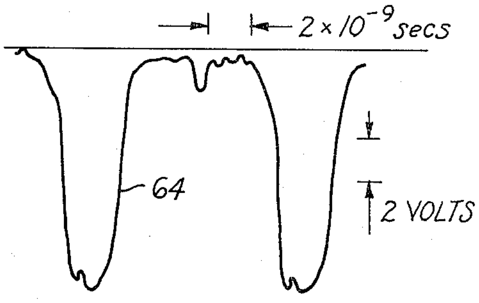
Figure 4B:
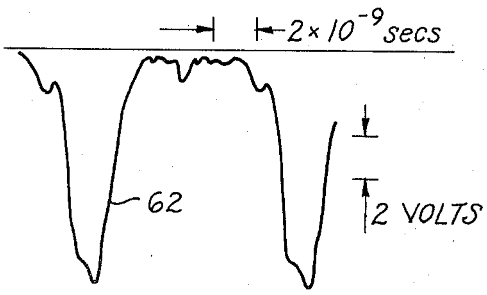

The circuit of FIGURE 3 was constructed using a signal generator 10 generating a 100 m.c. sine wave of voltage; one type 1N696 diode exhibiting storage properties, manufactured by Western Electric Company, as the control diode 14; two type FD100 diodes, exhibiting storage properties, manufactured by Fairchild semiconductors, as the output diode 20; two types MA4121 conventional diodes, manufactured by Microwave Associates, as the clipping diode 46; and a 50 ohm resistor as the output resistor 48. A co-axial air transmission line, having a characteristic impedance of 50 ohms, was used for the transmission line 38 in three different lengths: a nine inch line, an eighteen inch line, and a thirty-three inch line. FIGURE 4*a* shows a curve illustrating the output voltage waveform from the circuit, as shown on an oscilloscope, with a repetition rate of 100 m.c.s. derived using the nine inch line; FIGURE 4*b* shows a curve 62 illustrating the output voltage waveform using the eighteen inch line; and FIGURE 4*c* shows a curve 64 illustrating the output voltage waveform using the thirty-three inch line. Note the control of the wave shape of the output pulses obtainable by variation of the length of the line, particularly in the rise and fall time of the pulses.

Figure 5A:
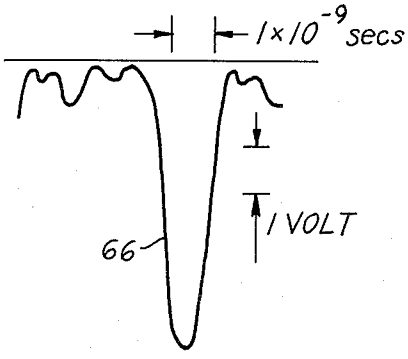
Figure 5B:
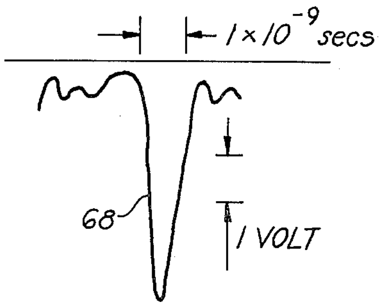

The circuit was also built and operated for repetition rates of 200 and 300 m.c.s. using type SSD558 storage diodes manufactured by the General Electric Company, as the control and output diodes 14, 20 in the configuration shown in FIGURE 3 with an adjustable length air line. The output pulse waveform obtained at 200 m.c.s. is shown as curve 66 in FIGURE 5*a*, and the output pulse waveform obtained at 300 m.c.s. is shown as curve 68 in FIGURE 5*b*.

FIGURE 6 illustrates another embodiment of the invention in which two opposite polarity output pulses may be simultaneously obtained using a single signal generator. The circuit of FIGURE 6 is identical to the circuit of FIGURE 3 with the exception that a second set of storage and output diodes have been connected in parallel and in the opposite polarity with the storage and output diodes shown in FIGURE 3. The opposite polarity diodes carry primed reference numerals corresponding to the reference numerals of the FIGURE 3 elements. Negative-going output pulses are available from the output terminals 50 of FIGURE 6 in the manner described in connection with FIGURE 3, and positive plurality output pulses are available from the output terminals 50′ in a similar manner. The wave shape of typical output pulses from the terminals 50 and 50′ are shown in FIGURES *7a* and *7b*, respectively, as curves 70 and 70′, respectively.

What is claimed is:

1. A pulse generator circuit for generating regularly recurring voltage pulses, comprising in combination:

a signal generator for developing an alternating voltage signal having a frequency equal to the desired repetition rate of said voltage pulses;

a first and a second storage diode semiconductor devices, each of said devices having a high conductivity state when forward biased by a signal voltage, a high conductivity state for a recovery time period when reverse biased by a signal voltage following a period of forward bias current flow, said recovery time period being dependent on the amount and duration of prior forward bias current flow, and a decay period at the termination of said recovery time period during which said devices under reverse bias fall rapidly to a low conductivity state;

means for connecting said alternating voltage signal from said signal generator circuit across the series combination of said first and second storage diode devices so that forward current flow in one of said devices is reverse current flow in the other of said devices; and means for deriving regularly recurring output voltage pulses from the voltage across one of said devices.

2. A pulse generator circuit for generating regularly recurring voltage pulses, comprising in combination:

a signal generator for developing an alternating voltage signal, at a pair of output terminals, having a frequency equal to the desired repetition rate of said voltage pulses;

a first and a second storage diode semiconductor devices, each of said devices having a high conductivity state when forward biased by a signal voltage, a high conductivity state for a recovery time period when reverse biased by a signal voltage following a period of forward bias current flow, said recovery time period being dependent on the amount and duration of prior forward bias current flow, and a decay period at the termination of said recovery time period during which said devices under reverse bias fall rapidly to a low conductivity state;

means for connecting said first and second storage diode devices in series across the pair of output terminals of said signal generator circuit, said devices being poled in opposite directions; and means for deriving regularly recurring output voltage pulses from the voltage across one of said devices.

3. A pulse generator circuit for generating regularly recurring voltage pulses, comprising in combination:

a signal generator for developing an alternating voltage signal, at a pair of output terminals having a frequency equal to the desired repetition rate of said voltage pulses;

a first and a second storage diode semiconductor devices, each of said devices upon being reverse biased following a prior period of current flow through under forward bias having a recovery time period during which said devices exhibit a high value of conductivity in the reverse direction, the duration of said recovery period being dependent on the amount and duration of said prior current flow therethrough under forward bias, and a decay period, occurring at the termination of said recovery period during which the conductivity of said devices in the reverse direction falls rapidly to a low value;

means for connecting said first and second storage diode devices in series across the pair of output terminals of said signal generator circuit, said devices being poled in opposite directions;

means for deriving regularly recurring output voltage pulses from the voltage across one of said devices.

4. A pulse generator circuit for generating regularly recurring voltage pulses, comprising in combination:

a signal generator for developing a substantially symmetrical alternating voltage signal having a frequency equal to the desired repetition rate of said voltage pulses;

a first and a second storage diode semiconductor devices, each of said devices upon being reverse biased following a prior period of current flow therethrough under forward bias having a recovery period during which said devices exhibit a high value of conductivity in the reverse direction, the duration of said recovery period being dependent on the amount and duration of said prior current flow therethrough under forward bias, and a decay period, occurring at the termination of said recovery period, during which the conductivity of said devices in the reverse direction falls rapidly to a low value;

means including a transmission line for connecting said alternating voltage signals from said signal generator circuit across the series combination of said first and second storage diode devices, said devices being poled in opposite directions; and means for deriving regularly recurring output voltage pulses from the voltage across one of said devices.

5. A pulse generator circuit for generating regularly recurring voltage pulses, comprising in combination:

a signal generator for developing a substantially symmetrical alternating voltage signal across an output inductor, said signal having a frequency equal to the desired repetition rate of said voltage pulses;

a first and a second storage diode semiconductor devices, each of said devices upon being reverse biased following a prior period of current flow through under forward bias having a recovery period during which said devices exhibit a high value of conductivity in the reverse direction, the duration of said recovery period being dependent on the amount and duration of said prior current flow therethrough under forward bias, and a decay period, occurring at the termination of said recovery period, during which the conductivity of said devices in the reverse direction falls rapidly to a low value;

a co-axial transmission line having an inner and an outer conductor;

a pickup coil means electrically connected between said inner and said outer conductors at one end of said line and inductively coupled to said output inductor of said signal generator for applying said voltage signals to said line;

means for connecting said first and second storage diode devices in series between the inner and outer conductors at the other end of said line, said devices being poled in opposite directions; and means for deriving regularly recurring output voltage pulses from the voltage across one of said devices.

6. A pulse generator circuit for generating regularly recurring voltage pulses, comprising in combination:

a signal generator for developing a substantially symmetrical alternating voltage signals across an output inductor, said signals having a frequency equal to the desired repetition rate of said voltage pulses;

a first and a second storage diode semiconductor devices, each of said devices upon being reverse biased following a prior period of current flow through under forward bias having
a recovery period during which said devices exhibit a high value of conductivity in the reverse direction, the duration of said recovery period being dependent on the amount and duration of said prior current flow therethrough under forward bias,
and a decay period, occurring at the termination of said recovery period, during which the conductivity of said devices in the reverse direction falls rapidly to a low value;
a co-axial transmission line having an inner and an outer conductor;
means for connecting said outer conduction to a point of reference potential for said circuit;
a pickup coil means electrically connected between said inner and said point of reference potential and inductively coupled to said output inductor of said signal generator for applying said voltage signals to said line;
means for connecting said first and second storage diode devices in series between said inner conductor at the other end of said line and said point of reference potential, said devices being poled in opposite directions; and
means for deriving regularly recurring output voltage pulses from the voltage across one of said devices.

7. A pulse generator circuit for generating regularly recurring voltage pulses, comprising in combination:
a source of alternating voltage signals;
a first and a second storage diode semiconductor devices, each of said devices having a reverse bias characteristic, following a prior period of forward bias current flow therethrough, exhibiting a high reverse conductivity during a recovery period followed by a decay period, during which decay period the conductivity of said devices in the reverse direction falls rapidly to a low value;
means for applying alternating voltage signals from said source across the series combination of said first and second storage diode devices poled in opposite directions; and
means for deriving regularly recurring output voltage pulses from the change in voltage across one of said devices.

8. A pulse generator circuit for generating regularly recurring voltage pulses, comprising in combination:
a source of signal alternating voltage signals, having a frequency equal to the desired repetition rate of said voltage pulses;
a first and a second storage diode semiconductor devices, connected in series, and in polarity opposition, each of said devices having
a high conductivity state when forward biased by a signal voltage,
a high conductivity state for a recovery time period when reverse biased by a signal voltage following a period of forward bias current flow, said recovery time period being dependent on the amount and duration of prior forward bias current flow,
and decay period at the termination of said recovery time period during which said devices under reverse bias fall rapidly to a low conductivity state;
means including a transmission line for applying signals from signals to said first and second storage diode devices; and
means for deriving regularly recurring output voltage pulses from the cyclic voltage change across one of said devices.

9. A pulse generator circuit comprising in combination:
a first and a second storage diode semiconductor devices, each of said devices having a reverse bias characteristic, following a prior period of forward bias current flow therethrough, exhibiting a high reverse conductivity during a recovery period followed by a decay period, during which decay period the conductivity of said device in the reverse direction falls rapidly to a low value;
a source of driving signals for said devices;
means for connecting said first and second devices in series in polarity opposition;
transmission line means connected between said source of driving signals and said first and second devices for applying said driving signals across the series combination of said devices and for shaping the signals applied to said devices; and
means for deriving output pulses from the change in voltage across one of said devices.

10. A pulse generator for generating high frequency output pulses comprising in combination,
an alternating signal generator,
a transmission line having a sending end and a terminating end, and a predetermined characteristic impedance,
coupling means for connecting said signal generator to the sending end of said transmission line to apply alternating signals thereto, and
a charge storage diode exhibiting a high conductance when forward biased, a high conductance for a recovery time period when reverse biased following a period of forward bias, and a low conductance at the termination of said recovery time period when reverse biased,
means for coupling said diode to the terminating end of said transmission line to produce unipolar pulses from said alternating signals,
said storage diode and said coupling means exhibiting impedance mismatches to the characteristic impedance of said transmission line to cause reflections of the unipolar pulses produced by said storage diode to control the waveshape of said output pulses.

11. A pulse generator for generating output pulses, comprising in combination,
a source of sinusoidal signals having a given period,
a charge storage diode exhibiting a high conductance when forward biased, a high conductance for a recovery time period when reverse biased following a period of forward bias, and a low conductance at the termination of said recovery time period when reverse biased,
means for applying said sinusoidal signals to said diode to produce unipolar pulses having a pulse width less than one-half of said given period,
each of said unipolar pulses having an initial portion exhibiting an abrupt leading edge and a trailing portion exhibiting an arcuate shape corresponding to said sinusoidal signals, and
means for applying other pulse signals derived from said unipolar pulse to said charge storage diode to convert the arcuate shape of the trailing portion of each of said unipolar pulses into an abrupt trailing edge.

12. A high frequency pulse generator comprising, in combination,
a source of sinusoidal high frequency signals having a given period,
a charge storage diode exhibiting a high conductance when forward biased, a high conductance for a recovery time period when reverse biased following a period of forward bias, and a low conductance at the termination of said recovery time period when reverse biased,
means for applying said sinusoidal high frequency signals to said diode to produce unipolar pulses having a pulse width less than one-half of said given period, each of said unipolar pulses having an initial portion exhibiting an abrupt leading edge and a trailing portion exhibiting an arcuate shape corresponding to said sinusoidal signals, and means coupled to said charge storage diode for reflecting away from and retransmitting back to said charge storage diode said unipolar pulses to convert the arcuate shape of the trailing edge of each of said unipolar pulses into an abrupt trailing edge.

References Cited by the Examiner

UNITED STATES PATENTS

| | | | |
|---|---|---|---|
| 2,737,601 | 3/56 | McMahon | 307—88.5 |
| 2,825,820 | 3/58 | Sims | 307—88.5 |
| 2,976,429 | 3/61 | Abbott et al. | 307—88.5 |
| 3,132,259 | 5/64 | Magleby | 307—88.5 |

ARTHUR GAUSS, *Primary Examiner.*